United States Patent [19]
Mekkoth et al.

[11] Patent Number: 6,154,455
[45] Date of Patent: Nov. 28, 2000

[54] PRIORITIZING PILOT SET SEARCHING FOR A CDMA TELECOMMUNICATIONS SYSTEM

[75] Inventors: Ajith Mekkoth, San Diego; Darin Yeoman, Escondido; Adam Gould; Joe Dowling, both of San Diego, all of Calif.

[73] Assignee: Nokia Mobile Phones Limited, Espoo, Finland

[21] Appl. No.: 08/998,171

[22] Filed: Dec. 24, 1997

[51] Int. Cl.⁷ .................................................. H04J 13/00
[52] U.S. Cl. .................... 370/342; 370/332; 370/335; 370/320; 455/442; 455/443
[58] Field of Search ...................... 370/241, 331, 370/332, 335, 342, 311, 320, 397, 399, 209, 208; 455/436, 437, 438, 439, 440, 442, 443, 67.1

[56] References Cited

U.S. PATENT DOCUMENTS

| | | | |
|---|---|---|---|
| 5,345,448 | 9/1994 | Keskitalo | 370/95.3 |
| 5,410,733 | 4/1995 | Niva et al. | 455/33.2 |
| 5,440,597 | 8/1995 | Chung et al. | 375/200 |
| 5,483,668 | 1/1996 | Malkamaki et al. | 455/33.2 |
| 5,491,718 | 2/1996 | Gould et al. | 375/205 |
| 5,524,009 | 6/1996 | Tuutijarvi et al. | 370/95.3 |
| 5,548,616 | 8/1996 | Mucke et al. | 375/295 |
| 5,566,201 | 10/1996 | Ostman | 375/200 |
| 5,577,022 | 11/1996 | Padovani et al. | 370/13 |
| 5,640,414 | 6/1997 | Blakeney, II et al. | 370/332 |
| 5,644,591 | 7/1997 | Sutton | 375/200 |
| 5,828,661 | 10/1998 | Weaver, Jr. et al. | 370/332 |
| 5,946,621 | 8/1999 | Chheda et al. | 370/332 |
| 5,987,012 | 11/1999 | Bruckert et al. | 370/331 |

*Primary Examiner*—Douglas W. Olms
*Assistant Examiner*—Shick Hom
*Attorney, Agent, or Firm*—Milan Patel; Harry F Smith

[57] ABSTRACT

This invention teaches methods, and circuits that operate in accordance with the methods, for improving the management and control of pilot channel sets for a CDMA mobile station. In one aspect a Priority Neighbor Search technique is provided, wherein a list of Priority Neighbor pilot channels is maintained and searched with a higher priority than the Neighbor Set pilot channels. In a further aspect this invention provides a Dropped Pilot Channel Search technique wherein a set is made of the last pilot channel or pilot channels dropped from the Active Set, wherein the dropped pilot channels are searched for some period of time with a higher priority than the Neighbor Set pilot channels. This invention also provides a High Priority Search Set feature which includes members of the Active Set, the Candidate Set, the Dropped Pilot Set, and the Priority Neighbor Set.

8 Claims, 6 Drawing Sheets

PRIORITIZING PILOT SET SEARCHING FOR A CDMA TELECOMMUNICATIONS SYSTEM

FIELD OF INVENTION

This invention relates generally to a telecommunications apparatus and methods, and in particular, to mobile stations that are compatible with code division multiple access (CDMA) protocols.

BACKGROUND OF THE INVENTION

The TIA/EIA Interim Standard, Mobile Station-Base Station Compatibility Standard for Dual-Mode Wideband Spread Spectrum Cellular System, TIA/EIA/IS-95 (Jul. 1993) defines a "Pilot Channel", also known as a "pilot", as an unmodulated, direct sequence spread spectrum signal transmitted continuously by each CDMA base station. The Pilot Channel allows a mobile station to acquire the timing of the Forward CDMA Channel, provides a phase reference for coherent demodulation, and provides a means for making signal strength comparisons between base stations for determining when to handoff. The pilot sequence is a Walsh code "0" spread by a pair of modified maximal length PN sequences with period $2^{15}$. A Traffic Channel is defined as a communication path between a mobile station and a base station that carries user and signaling traffic, and includes a Forward Traffic Channel and Reverse Traffic Channel pair. Different base stations are identified by different pilot channel PN sequence offsets.

Section 6.6.6.2.6 of IS-95 is concerned with the maintenance of the Active Set, Candidate Set, and Neighbor Set. The Active Set is the set of pilot channels associated with the CDMA Channels containing Forward Traffic Channels assigned to a particular mobile station. The Candidate Set is the set of pilot channels that have been received with sufficient strength by the mobile station to be successfully demodulated, but have not been placed in the Active Set by the base station. The Neighbor Set is the set of pilot channels associated with the CDMA channels that are probable candidates for handoff. Normally, the Neighbor set contains pilot channels associated with CDMA channels that cover geographical areas near the mobile station. Once a pilot channel has been selected into the Active Set, the Forward Traffic Channel and the Reverse Traffic Channel convey digital voice and/or data to and from the mobile station, respectively.

A Remaining Set is defined to be the set of all allowable pilot offsets, excluding the pilot offsets of the pilot channels in the Active Set, Candidate Set, and Neighbor Set.

Reference is made to FIG. 2 which is an example from the prior art standard illustrating how pilot channel strength is used to add or drop a pilot channel from a particular set. Further, FIG. 3 shows the prior art general flow of pilot channels from the Neighbor Set 51, to the Candidate Set 52, to the Active Set 53, including the possibility that a pilot channel may be grouped into the Remaining Set 54. The CDMA mobile station maintains the Active Set by tracking pilot strength, which is the ratio of received pilot channel energy to overall received energy. The overall goal is to keep the Traffic Channel uninterrupted.

If a pilot is in the Active Set, only the base station may command the mobile station to drop this pilot channel into one of the alternative sets. A turnaround time parameter may be defined as the time required for a weak pilot channel dropped from the Active Set into the Neighbor Set to be placed back into the Candidate Set, if at the moment it is dropped, its signal strength were to instantaneously increase above a specified threshold (T_ADD). This threshold is specified in the IS-95 Standard as the signal strength level at which a pilot may be moved from the Neighbor Set into the Candidate Set.

A Handoff is defined by IS-95 as the act of transferring communication with a mobile station from one base station to another. A Hard Handoff is defined as a handoff characterized by a temporary disconnection of the Traffic Channel. Hard Handoffs occur when the mobile station is transferred between disjoint Active Sets, the CDMA frequency assignment changes, the frame offset changes, or the mobile station is directed from a CDMA Traffic Channel to an analog voice channel. A Soft Handoff is preferable and is characterized by commencing communications with a new base station on the same CDMA frequency assignment before terminating communications with the old base station.

There are instances when the conventional implementation of IS-95 is unsatisfactory. This is particularly true in weak signal and so called "pilot polluted" areas. Such areas include urban high-rise building areas, and areas of uneven terrain. It has been found that in these areas, a strong pilot channel may be dropped from the Active Set due to a temporary loss of signal strength, only for the dropped pilot channel to reappear shortly as a strong signal. This situation may reduce the quality of the communication link or even result in a dropped call.

Reference is made to U.S. Pat. No. 5,577,022 to Padovani et al., issued Nov. 19, 1996 and entitled "PILOT SIGNAL SEARCHING TECHNIQUE FOR A CELLULAR COMMUNICATIONS SYSTEM." As described in this patent, a mobile station maintains, in addition to the Active and Neighbor sets, a list of Candidate and Pre-Candidate Sets of pilot channels. Base station entries from Neighbor Set may be assigned to the Pre-Candidate and Candidate Sets, and eventually to the Active Set, based on an analysis of signal strength.

OBJECTS AND ADVANTAGES OF THE INVENTION

It is an object and advantage of this invention to provide an improved method and an apparatus for prioritizing a neighbor pilot channel set search, dropped pilot channel set search, and overall pilot channel set handling to enhance the capabilities of a CDMA mobile station.

It is a further object and advantage of this invention to provide a Priority Neighbor Pilot Channel Set in conjunction with providing a Dropped Pilot Channel Set, wherein a set is made of the last pilot channel or pilot channels dropped from the Active Set, and wherein pilot channels of the Dropped Pilot Channel Set are searched for some period of time with a higher priority than the Neighbor Set pilot channels.

It is another object and advantage of this invention to provide a High Priority Search Set and a method for allocating pilot channels, identified from the Priority Neighbor Pilot Channel Set and the Dropped Pilot Channel Set, to the High Priority Search Set. The allocation may be, by example, a 1:2 ratio, wherein one priority neighbor pilot channel is allocated for every two dropped pilot channels. However other ratios may be selected based on the system's performance requirements.

It is one further object and advantage of this invention to provide a pilot channel searching methodology for promoting and demoting pilot channels.

SUMMARY OF THE INVENTION

The foregoing and other problems are overcome and the objects of the invention are realized by methods and apparatus in accordance with embodiments of this invention. The method is implemented by a mobile station in conjunction with base stations. This invention teaches methods, and circuits that operate in accordance with the methods, for better controlling the set handling of pilot channels and for promoting and demoting pilot channels amongst the sets.

A first method includes a search for the last dropped pilot channels. This method includes steps of: identifying a pilot channel that was dropped from the Active Set; forming a set of the identified dropped pilot channels as a Dropped Pilot Channel Set; initializing a timer for each dropped pilot channel identified; searching the Dropped Pilot Channel Set with a higher priority than the Neighbor Set; and removing a pilot channel from the Dropped Pilot Channel Set when the pilot channel's timer has expired. This method preferably includes a step of moving a pilot channel from the Dropped Pilot Channel Set to the Neighbor Set of pilot channels upon expiration of the pilot channel's timer.

The preferred embodiment of this invention combines the Dropped Pilot Channel Search method above with a Priority Neighbor Set Search method to provide a High Priority Pilot Channel Search Set.

The Priority Neighbor Search method includes steps of: identifying one or more of the strongest neighbor pilot channels; forming a set of identified strongest neighbor pilot channels as a Priority Neighbor Set; and searching the Priority Neighbor Set with a higher priority than the Neighbor Set of pilot channels. In this preferred method, the pilot channels searched include the: Active Set, Candidate Set, Dropped Pilot Set, Priority Neighbor Set, and Neighbor Set. This method of search expedites the search for a pilot channel in comparison to the prior art.

The use of the Priority Neighbor Set search may include reporting a measured signal strength of the Priority Neighbor Set pilot channels to a base station when the pilot channel signal strength is greater than or equal to a specified signal strength threshold.

In the preferred embodiment of this invention the High Priority Search Set is a composite set that comprises members of the Active Set and the Candidate Set, as well as certain members of the Priority Neighbor Set and the Dropped Pilot Set. A ratio of, by example, one pilot channel from the Priority Neighbor Set can be selected for every two dropped pilot channels from the Dropped Pilot Channel Set. Other ratios may also be used, and/or the ratio may be made variable depending on operating conditions.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
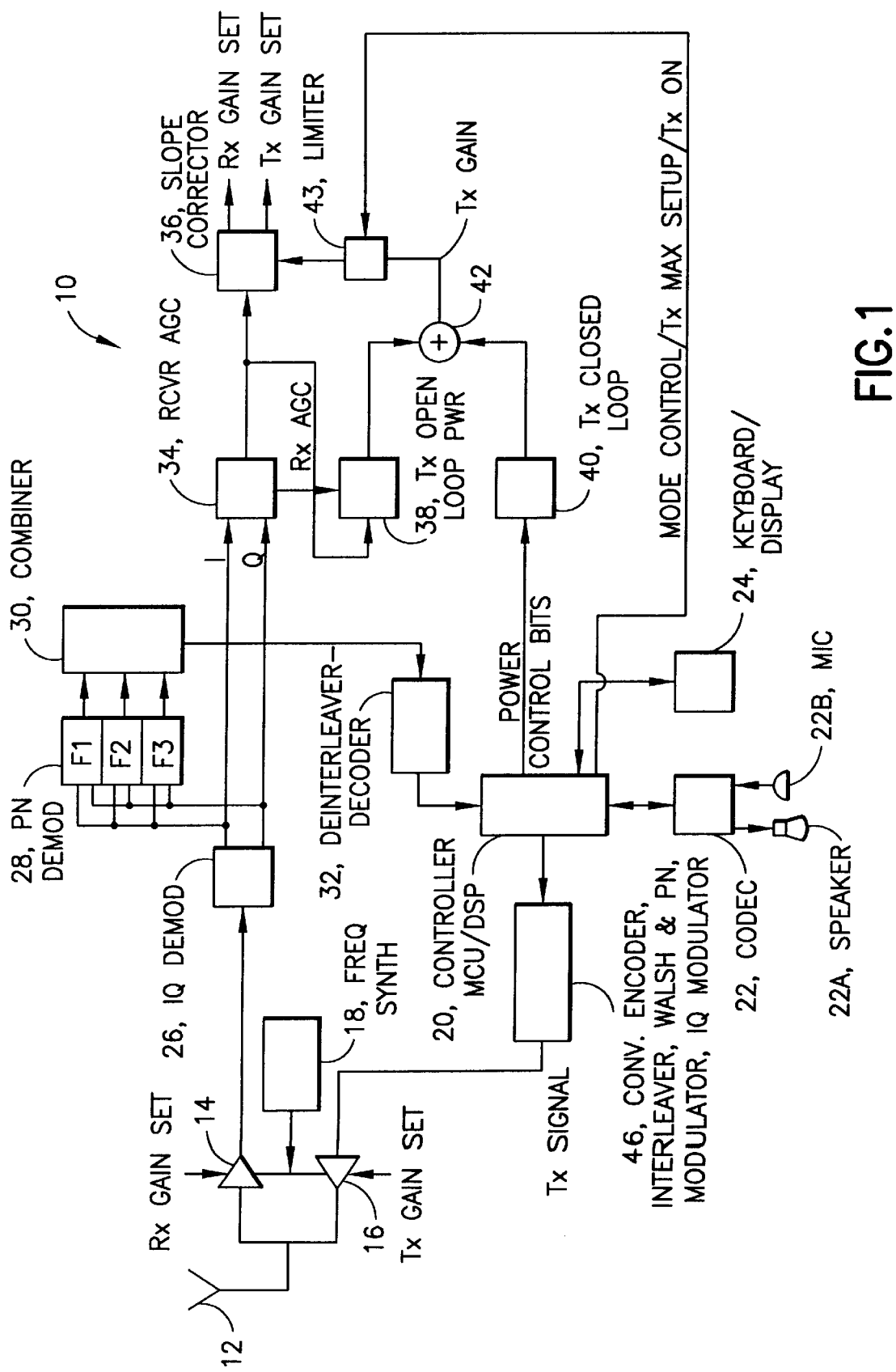
FIG. 1 is a block diagram of a CDMA mobile station that is suitable for use in practicing the teaching of this invention.

Referring to FIG. 1 there is illustrated an embodiment of a spread spectrum CDMA mobile station 10 that is suitable for practicing this invention. Reference may also be had to commonly assigned U.S. Pat. No. 5,548,616, the teaching of which is incorporated by reference herein in its entirety. Certain blocks of the CDMA mobile station 10 may be implemented with discrete circuit elements, or as software routines that are executed by a suitable digital data processor, such as a high speed signal processor. Alternatively, a combination of circuit elements and software routines can be employed. As such, the ensuing description is not intended to limit the application of this invention to any one particular technical embodiment.

In the preferred embodiment of this invention the spread spectrum CDMA mobile station 10 operates in accordance with the TIA/EIA Standard, CDMA Mobile Station-Base Station Compatibility Standard for Dual-Mode Wideband Spread Spectrum Cellular System, TIA/EIA/IS-95, as modified if required by the teachings of this invention. However, compatibility with this particular standard is not to be considered a limitation upon the practice of this invention.

The CDMA mobile station 10 includes an antenna 12 for receiving RF signals from a cell site, hereafter referred to as a base station (not shown), and for transmitting RF signals to the base station. When operating in the digital (spread spectrum or CDMA) mode the RF signals are phase modulated to convey speech and signaling information. Coupled to the antenna 12 are a gain controlled receiver 14 and a gain controlled transmitter 16 for receiving and for transmitting, respectively, the phase modulated RF signals. A frequency synthesizer 18 provides the required frequencies to the receiver and transmitter under the control of a controller 20. The controller 20 is comprised of a slower speed MCU for interfacing, via a codec 22, to a speaker 22a and a microphone 22b, and also to a keyboard and a display 24. In general, the MCU is responsible for the overall control and operation of the CDMA mobile station 10. The controller 20 is also preferably comprised of a higher speed digital signal processor (DSP) suitable for real-time processing of received and transmitted signals.

The received RF signals are converted to base band in the receiver and are applied to a phase demodulator 26 which derives in-phase (I) and quadrature (Q) signals from the received signal. The I and Q signals are converted to digital representations by suitable A/D converters and applied to a three finger (F1–F3) demodulator 30, each of which includes a local PN generator. The output of the demodulator 28 is applied to a combiner 30 which outputs a signal, via a deinterleaver and decoder 32, to the controller 20. The digital signal input to the controller 20 is expressive of, by example, speech samples or signaling information. The further processing of this signal by the controller 20 is not germane to an understanding of this invention, and is not further described, except to note that the signaling information will include commands and information regarding pilot channels.

The I and Q signals output from the I-Q demodulator 26 are also applied to a receiver AGC block 34 which processes same to produce an output signal to an amplifier slope corrector block 36. One output of the slope corrector block 36 is the RX GAIN SET signal which is used to automatically control the gain of the receiver 14.

The output of the receiver AGC block 34 is also applied to a TX open loop power control block 38. A TX closed loop control block 40 inputs the received transmitter power control bits from controller 20. An adder 42 adds the output of the TX open loop control block 38 to the output of the TX closed loop control block 40 and generates a sum signal which is the TX-GAIN signal that is applied to the transmitter 16 to control the output power thereof. Preferably this signal is slope corrected as required for the transmitter amplifier.

An input to the transmitter 16 (vocoded speech and/or signaling information) is derived from the controller 20 via a convolutional encoder, interleaver, Walsh modulator, PN modulator, and I-Q modulator, which are shown generally as the block 46.

Figure 4:
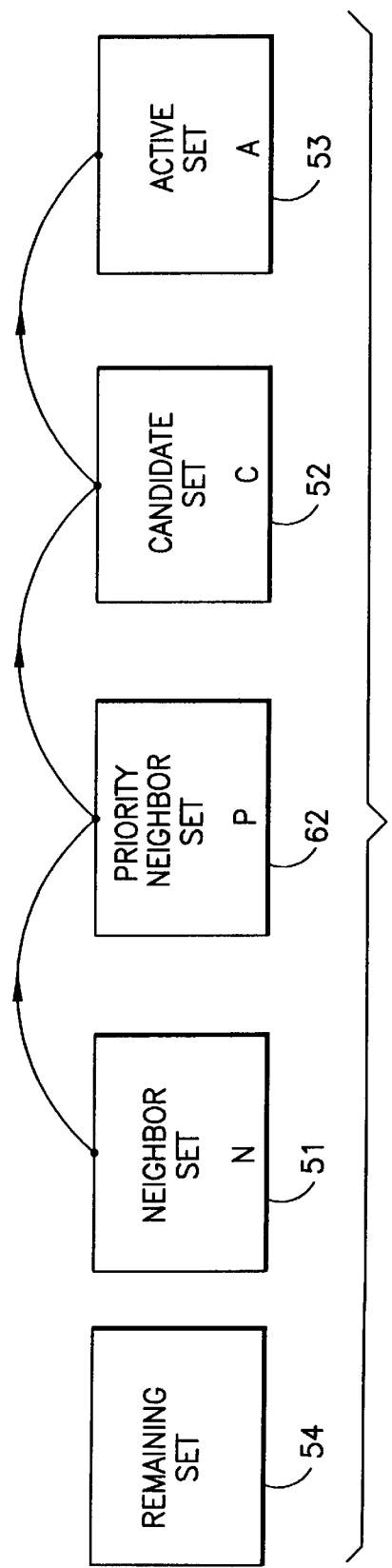
FIG. 4 is a logic flow diagram of the Priority Neighbor Search.

Referring to FIG. 4, shown is a logic diagram of a Priority Neighbor Search. The purpose of this search is to speed the search for a strongest neighbor pilot channel, which is defined as a nearby pilot channel with the strongest pilot strength. A Priority Neighbor Set 62 is formed as a separate set of strongest neighbor pilot channels (N_p). The CDMA mobile station 10 preferably searches the Priority Neighbor Set 62 with a higher priority than the search of the conventional Neighbor Set 51.

Figure 2:
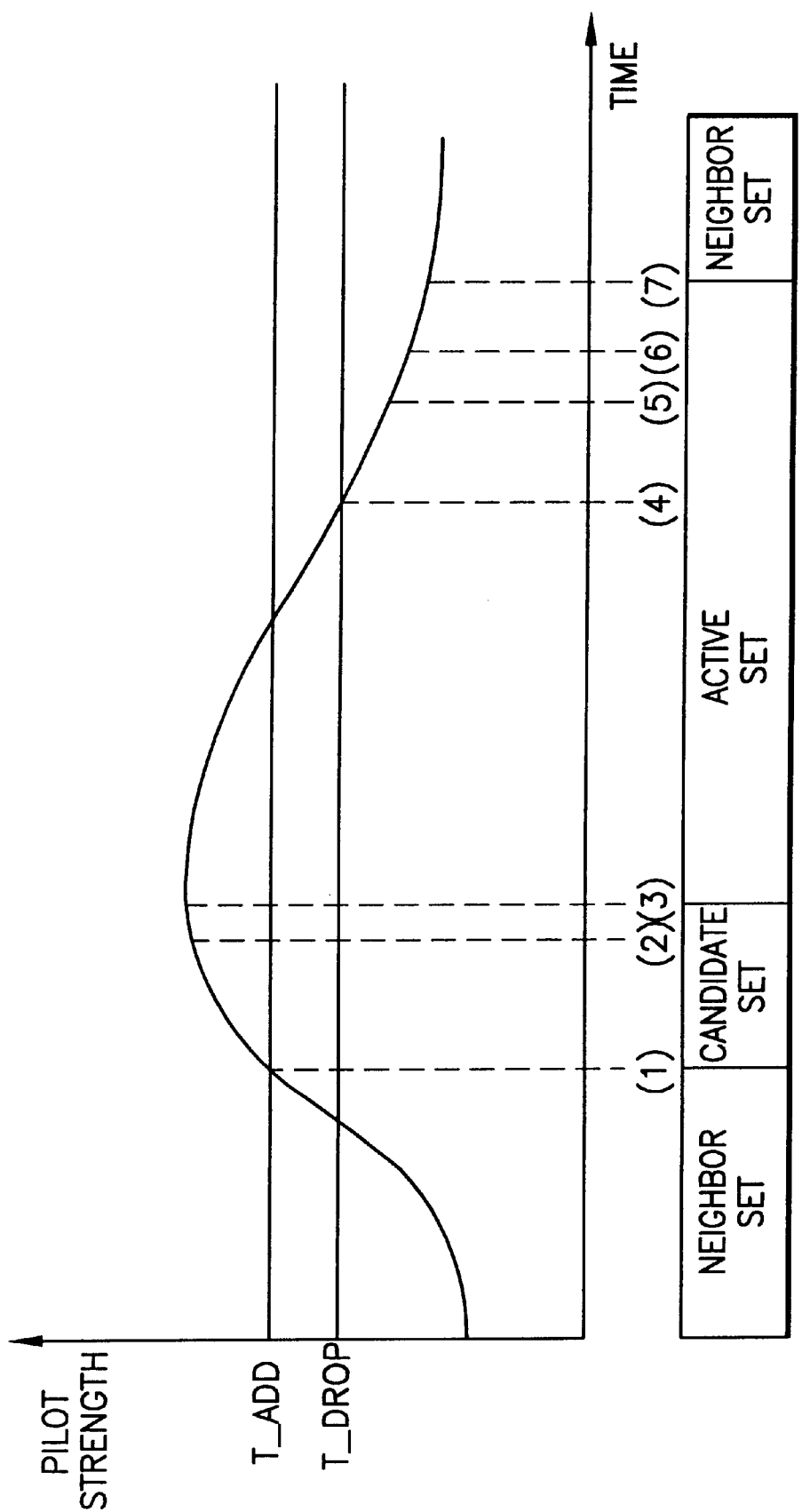
FIG. 2 illustrates an example of a typical message exchange using the IS-95 standard.
Figure 3:
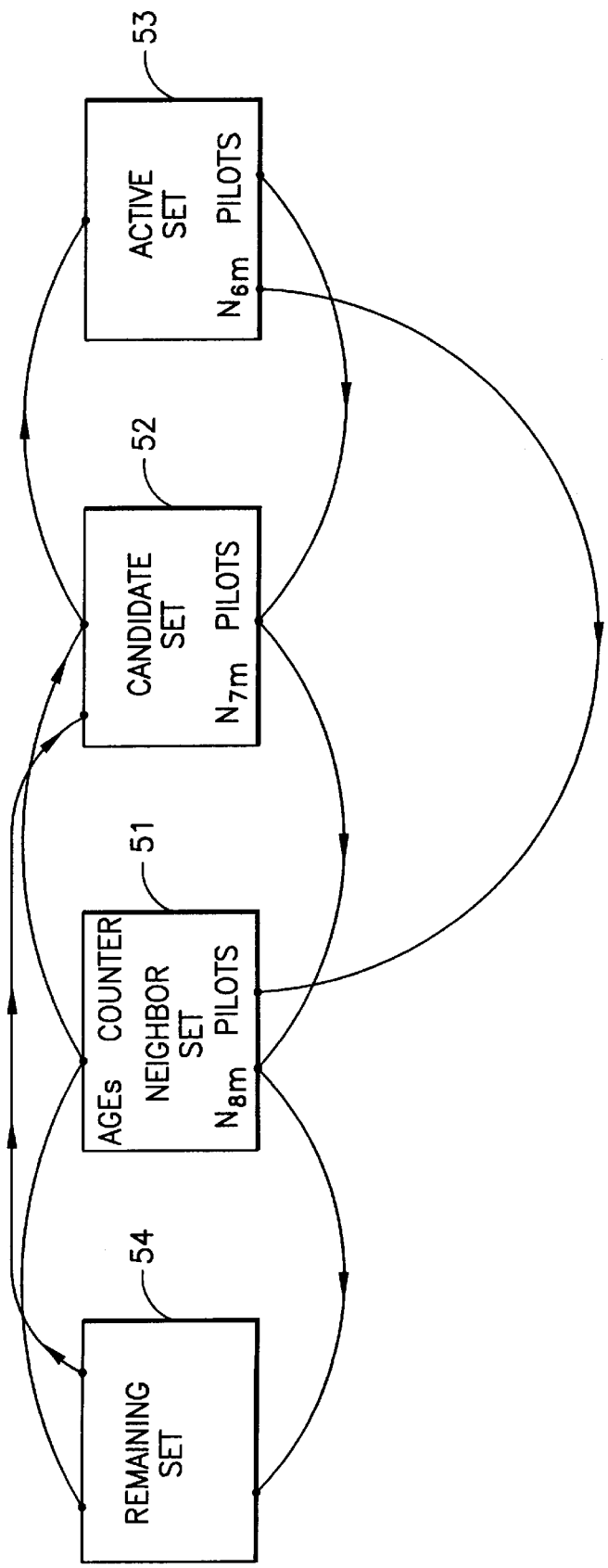
FIG. 3 is a logic flow diagram of the conventional pilot channel strength search technique.

The Priority Neighbor Set search technique eliminates the worst case scenario under the traditional method of FIGS. 2 and 3. The worst case occurs when all pilot channels in the Neighbor Set are given the same priority, and the maximum "N8m" pilot channels are present in the Neighbor Set ("N8m" is a constant defined in IS-95 appendix D CDMA CONSTANTS, table D-2). In such a case, a handoff may not occur in time to preclude dropping of the channel. Suitable algorithm steps are:

find Priority Neighbor pilot channels or "N_p";

and search Priority Neighbor pilot channels with a higher priority than the Neighbor Set.

A suitable search routine searches the pilot channels in the order:{
A(1) . . . A(i), C(1) . . . C(i), P(i) . . . P(N_p), N(2),
A(1) . . . A(i), C(1) . . . C(i), P(i) . . . P(N_p), N(2),
A(1) . . . A(i), C(1) . . . C(i), P(i) . . . P(N_p), N(i)}.
(Where: A=Active Set, C=Candidate Set, P=Priority Neighbor Set, N=Neighbor Set.)

The Priority Neighbor Set 62 is preferably searched with a high priority, in that the "P(i) . . . P(N_p)" step is performed before the Neighbor Set 51 search.

Figure 5:
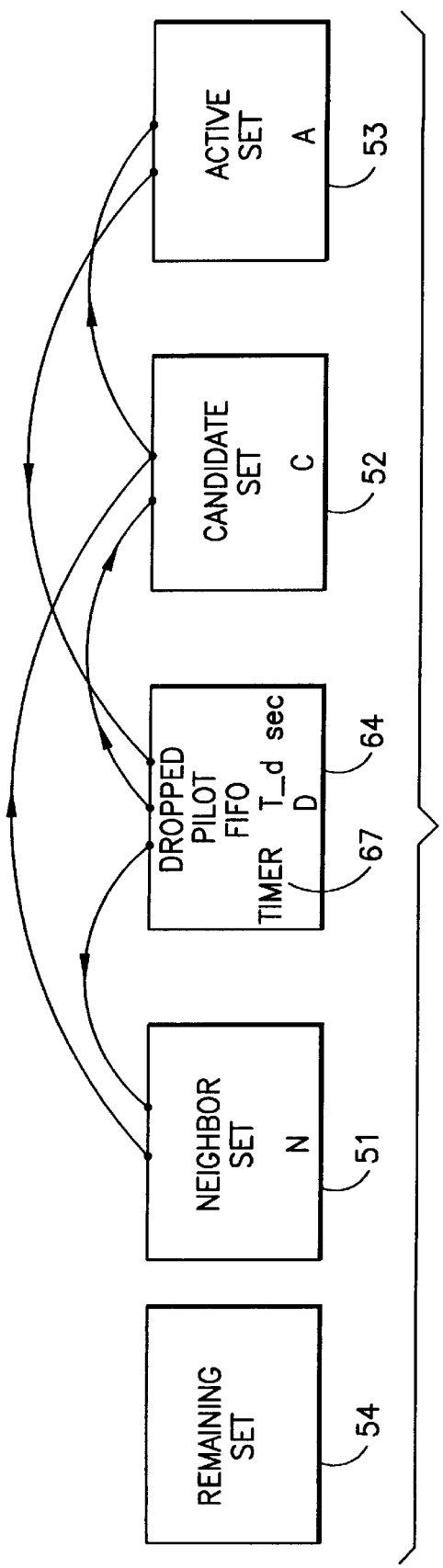
FIG. 5 is a logic flow diagram of a first embodiment of this invention, i.e., the Dropped Pilot Channel Set Search.
Figure 6:
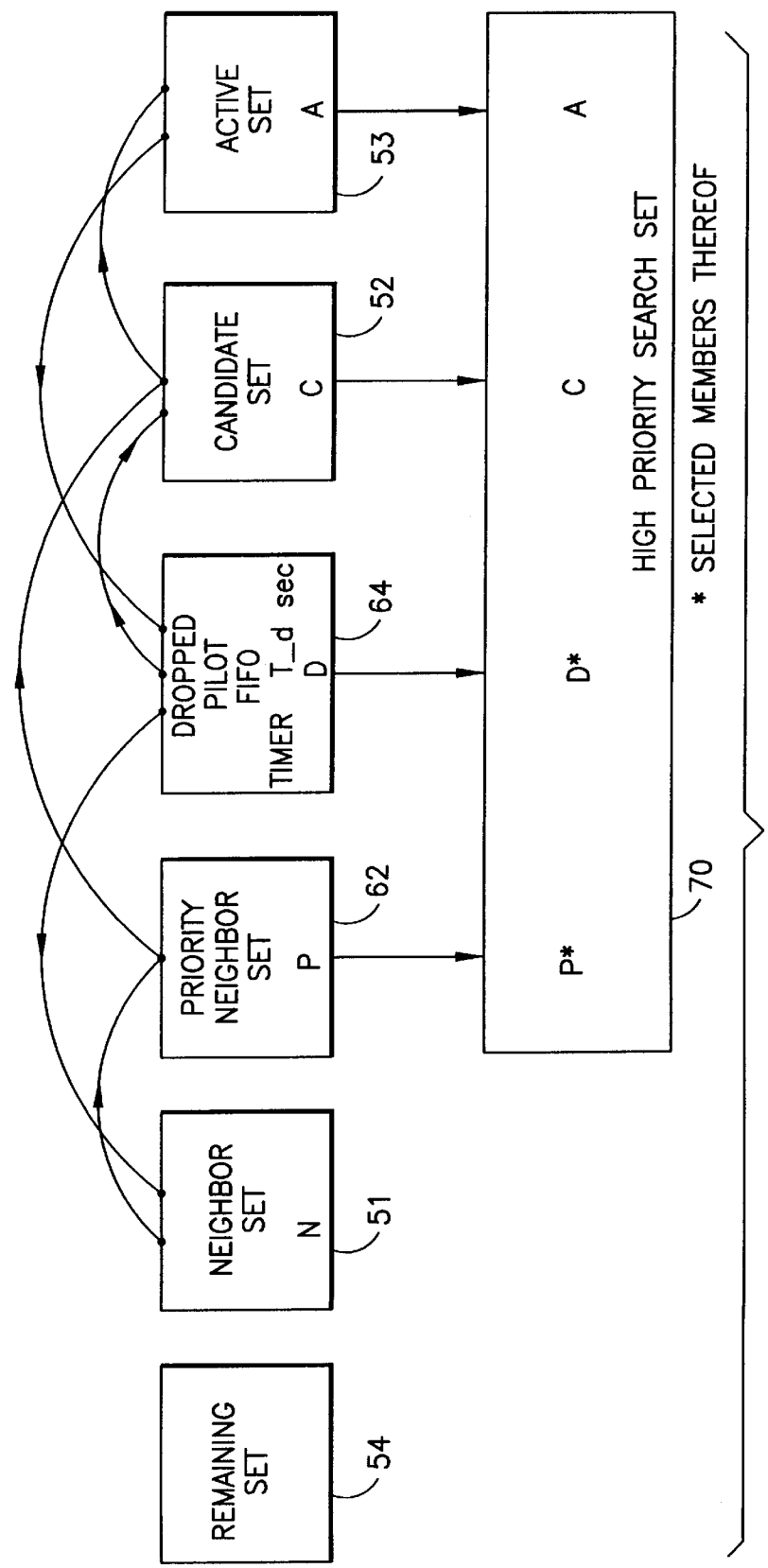
FIG. 6 is a logic flow diagram of a preferred embodiment of this invention. The diagram also shows an implementation of a High Priority Search Set feature.

Reference is now made to FIGS. 5–6 for the description of the embodiments of the present invention.

Referring to FIG. 5, a logic diagram is shown of the first embodiment, the Dropped Pilot Channel Set Search. A feature of this embodiment is to track, and quickly retrieve, the last dropped pilot channels (N_d) from the Active Set 53 and search these N_d pilot channels with higher priority than the Neighbor Set 51 pilot channels. This allows efficient operation of the CDMA mobile station 10 in rough terrain areas, and pilot polluted areas, wherein a strongest pilot channel can be inefficiently dropped by using the conventional set maintenance order. The CDMA mobile station 10 identifies and forms the Dropped Pilot Channel Set 64 in a First-In First-Out (FIFO) basis with timer regulation. A timer 67 allows the dropped pilot channel or channels to remain in the Dropped Pilot Channel Set for T_d seconds, where T_d may be of fixed duration or may be made a variable. After the expiration of the timer 67 for a particular one of the dropped pilot channels, the pilot channel may be moved to the Neighbor Set, if still applicable, and is given the same priority as any of the other Neighbor Set pilot channels.

An exemplary algorithm of the first embodiment includes steps of:

drop one or more specified pilot channels from active set;

move the dropped pilot channels into the Dropped Pilot Channel Set 64 (First-In/First-Out buffer);

start a timer 67 for each dropped pilot channel added to the Dropped Pilot Channel Set 64; and search pilot channels in the order:{
A(1) . . . A(i), C(1) . . . C(i),D(i) . . . D(N_d),N(1),
A(1) . . . A(i), C(1) . . . C(i),D(i) . . . D(N_d),N(2), . . . ,
A(1) . . . A(i), C(1) . . . C(i),D(i) . . . D(N_d),N(i)};

if time is greater than "T_d" seconds, then move D(i) to the Neighbor Set.

(Where: A=Active Set, C=Candidate Set, D=Dropped Pilot Channel Set, N=Neighbor Set.)

Referring to FIG. 6, a logic diagram is shown of a further embodiment of this invention. This embodiment combines the advantages of the two searches above to further overcome delays associated with the conventional dropping of strong pilot channels due to operation in pilot polluted and rough terrain areas. As is shown in the diagram and the algorithm below, the Dropped Pilot Channel Set 64 and the Priority Neighbor Set 62 are each implemented, and both are searched before the Neighbor Set 51. Specifically, the Dropped Pilot Channel Set 64 and the Priority Neighbor Set 62 are searched before each individual member of the Neighbor Set is searched, i.e. before (N1, N2, . . . , N(i)) of the Neighbor Set are searched.

As discussed above, it has been observed that in pilot polluted and rough terrain areas the strongest pilot channel may be dropped only to reappear as the strongest pilot channel. Identifying and searching these recently dropped pilot channels, in a quickly accessible and separate Dropped Pilot Channel Set 64, increases the likelihood of locating the strongest pilot channel in a pilot polluted or rough terrain area. This time saving enables a faster handoff.

Further time savings are realized by identifying and also searching the Priority Neighbor Set 62. The strongest neighbor pilot channels are tracked separately to eliminate time lost in searching the entire Neighbor Set 51. The savings in turnaround time realized by identifying and searching the Priority Neighbor Set, as opposed to the complete Neighbor set, can be significant.

One suitable embodiment of this invention for searching pilot channels has the search order of:

Search pilot channels in the order:{
A(1) . . . A(i) , C (1) . . . C(i),D(i) . . . (N_d) , P(i) . . . P(N_p), N(1);
A(1) . . . A(i), C(1) . . . C(i), D(i) . . . D(N_d), P(i) . . . P(N_p), N(2); . . .
A(1) . . . A(i), C(1) . . . C(i), D(i) . . . D(N_d),P(i) . . . P(N_p), N(i).}

(Where: A=Active Set, C=Candidate Set, D=Dropped Pilot Channel Set P=Priority Neighbor Set, N=Neighbor Set.)

In sum, combining these two searches provides an improved pilot channel search embodiment.

In addition, the number of pilot channels in the Dropped Pilot Channel Set search and the Priority Neighbor Set search may be actively managed with the implementation of a High Priority Search Set 70. The High Priority Search Set 70 contains a predetermined maximum number of members. The maximum number of members may be a constant identified as N_p, which may comprise all of the pilot channels in the Active and Candidate sets, with remaining space (if any) selectively allocated between members of the Priority Neighbor Set 62 and members of the Dropped Pilot Channel Set 64. The High Priority Search Set method ensures that a large Dropped Pilot Set size, and a large Priority Neighbor Set size, will not become an obstacle to the overall goal of expedited pilot channel searching while maintaining control over the traffic channel. Further, a fixed or variable ratio can be used to allocate priority and dropped pilot channels to the High Priority Search Set 70. By example, a ratio of one pilot channel selected from the Priority Neighbor Pilot Channel Set 62 for every two pilot channels selected from the Dropped Pilot Channel Set 64 may be used to selectively allocate the space remaining in the High Priority Search Set 70, once the members of the Active Set 53 and the Candidate Set 52 are included. Other ratios or selection techniques may be used, depending upon the desired maximum size allocated to High Priority Search Set 70.

The teaching of this invention provides a more efficient manner in which to search pilot channels. By example, by using the Dropped Pilot Channel Set Search embodiments adverse field operating characteristics are mitigated by exploiting the high probability that a dropped pilot channel in a pilot polluted or rough terrain area may quickly return as the strongest pilot channel. The searches described above are also combinable to form the preferred embodiment for use in the CDMA mobile station 10.

In the various embodiments of this invention, searching the pilot channel sets may be restricted by the total pilots to be searched and the time required to perform the signal strength measurements. For the system to operate properly, the Active Set 53 must be periodically searched at a rate which allows the active pilots to be accurately tracked so that loss of the established Traffic Channel can be prevented. This rate determines the maximum number of members of all pilot sets which may be searched. It should thus be realized that the particular order of searching the other sets of pilot channels need not follow exactly the orders shown above so long as the mobile station 10 meets the measurement criteria for the Active Set 53.

Thus, while the invention has been particularly shown and described with respect to preferred embodiments thereof, it will be understood by those skilled in the art that changes in form and details may be made therein without departing from the scope and spirit of the invention.

What is claimed is:

1. A method to perform a pilot channel search for use in a mobile station that maintains a Neighbor Set, Candidate Set, and Active Set of pilot channels, comprising steps of:

placing dropped pilot channels in a Dropped Pilot Channel Set;

placing strongest neighbor pilot channels in a Priority Neighbor Pilot Channel Set; and searching the Dropped Pilot Channel Set and the Priority Neighbor Pilot Channel Set as separate pilot channel search sets.

2. The method as in claim 1, wherein the sets of pilot channels that are searched include the: Active Set, Candidate Set, Dropped Pilot Channel Set, Priority Neighbor Set and one element of the Neighbor Set.

3. A method to perform a pilot channel search for use in a mobile station that maintains a Neighbor Set, Candidate Set, and Active Set of pilot channels, comprising steps of:

placing dropped pilot channels in a Dropped Pilot Channel Set;

placing strongest neighbor pilot channels in a Priority Neighbor Pilot Channel Set; and forming a composite pilot channel set comprised of members of the Active Set, the Candidate Set, members of the Dropped Pilot Channel Set and the Priority Neighbor Pilot Channel Set in accordance with a selected ratio.

4. The method as in claim 3, wherein the step of forming said composite pilot channel set selects pilot channels in said selected ratio of one pilot channel from the Priority Neighbor Pilot Channel Set for every two pilot channels from the Dropped Pilot Channel Set.

5. The method as in claim 3, and further comprising steps of:

initializing a timer for each dropped pilot channel upon the inclusion of the pilot channel in the Dropped Pilot Channel Set; and removing a pilot channel from the Dropped Pilot Channel Set upon expiration of the timer.

6. A mobile station comprising a controller for placing dropped pilot channels in a Dropped Pilot Channel Set, for placing strongest neighbor pilot channels in a Priority Neighbor Pilot Channel Set, and for forming a composite pilot channel set comprised of members of an Active Set, a Candidate Set, the Dropped Pilot Channel Set and the Priority Neighbor Pilot Channel Set, said controller selecting pilot channels in a ratio of x pilot channels from the Priority Neighbor Pilot Channel Set for every y pilot channels from the Dropped Pilot Channel Set.

7. The mobile station as in claim 6, wherein X=1 and y=2.

8. The mobile station as in claim 6, and further comprising a timer initialized for each dropped pilot channel upon the inclusion of the pilot channel in the Dropped Pilot Channel Set; and a control means being responsive to an expiration of a timer for removing an associated pilot channel from the Dropped Pilot Channel Set.

* * * * *